May 15, 1951 — CONSTANT RUGGIERO NOW BY CHANGE OF NAME CUSTER ROGERS — 2,553,113
METHOD OF PREPARING PORK HOCKS
Filed April 10, 1948
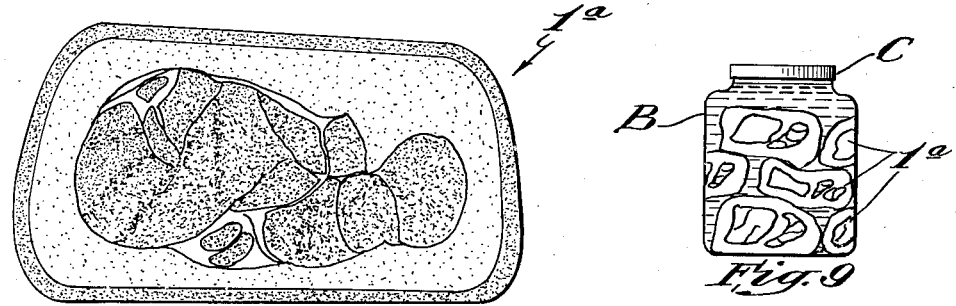
Fig. 1
Fig. 9
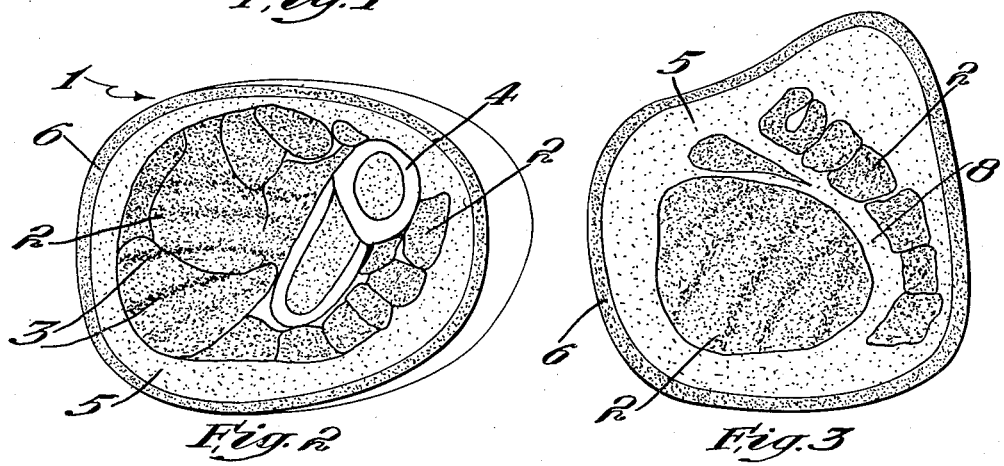
Fig. 2
Fig. 3
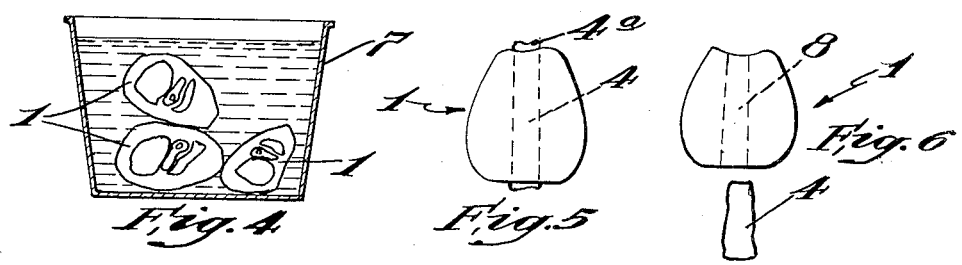
Fig. 4
Fig. 5
Fig. 6
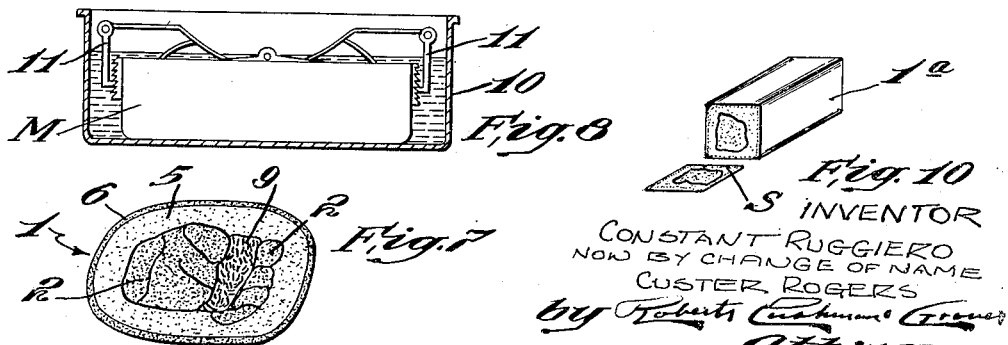
Fig. 8
Fig. 10
Fig. 7
INVENTOR
CONSTANT RUGGIERO
NOW BY CHANGE OF NAME
CUSTER ROGERS
by Roberts Cushman Grover
Att'ys.

Patented May 15, 1951

2,553,113

UNITED STATES PATENT OFFICE 2,553,113

METHOD OF PREPARING PORK HOCKS

Constant Ruggiero, Lawrence, Mass., now by change of name Custer Rogers

Application April 10, 1948, Serial No. 20,200

4 Claims. (Cl. 99—107)

This invention pertains to food preparation, more especially to a novel method of preparing meat for use, in particular pork hocks.

A pork hock is a piece cut by the butcher either from the front or hind leg of the animal just above the foot and below the shoulder or ham. Hocks are included among the parts generally known as trimmings. They are relatively cheap as compared with more desirable parts and are often used in the manufacture of products such as sausage, scrapple or head cheese whose constituents are comminuted and mixed with spices and other materials. However, although not in great demand, pork hocks, when properly prepared, are relished by many people for their unique consistency and flavor.

The raw hock as cut from the leg is a chunky piece of generally circular transverse section. It has an irregular bony core embedded in a mass of lean meat containing interspersed gristle. The lean meat is surrounded by layers of fat and the whole is encased in the skin or rind.

The irregular shape of the bony core, the streaks of gristle and the large percentage of fat make it impractical to separate the lean meat from the other parts prior to cooking. For this reason it is customary to cook the hock as a whole, including the bone and rind. However, when cooked sufficiently to make the gristly lean meat tender, the entire hock tends to fall apart and it has a dark, greasy and unattractive appearance.

Attempts have heretofore been made to preserve the general shape of the hock after cooking and after removal of the bone by confining the hock during the removal of the bone and then carefully placing the boned hock in a suitable container. However, the removal of the bone leaves a large central cavity within the lean portion, and even if the boned hock is successfully placed in the container without falling apart, its parts are still loosely united and it readily falls to pieces when removed from the container. Thus, it is difficult to bring it to the table in a shape such that it may be cut into slices of good size. Moreover, cooking the hock to tenderness before removing the bone results in a darkening of the meat which detracts from its value as a food product.

A principal object of the present invention is to provide a novel method of preparing pork hocks for use, in particular to prepare pork hocks in such a way that, when ready to eat, they are firm, coherent and capable of being sliced, while at the same time tender enough to eat. A further object is to provide a method of preparing pork hocks such that the meat, both lean and fat, is bright and clear when ready for the table, and of appetizing appearance. A further object is to provide a method of preparing pork hocks so that they are of a convenient shape for packing and slicing. A further object is to provide a pork hock having the above desirable characteristics and having the flavor of smoked pork. A further object is to provide a cooked pork hock of a firm consistency devoid of bone and having the bone cavity filled with an edible material. Other and further objects and advantages of the invention will be pointed out in the following more detailed description and by reference to the accompanying drawings wherein Fig. 1 is a transverse section diagrammatically illustrating a pork hock prepared in accordance with the present procedure;

Fig. 2 is a similar section of a raw hock before it has been cooked;

Fig. 3 is a similar section showing the appearance of the hock after partial cooking and after removal of the bone in accordance with the present method;

Fig. 4 is a diagrammatic section illustrative of the first step in the cooking operation in accordance with the present invention;

Fig. 5 is a diagrammatic elevation, to small scale, showing the appearance of the hock at the completion of the first stage in the cooking operation;

Fig. 6 is a similar diagram illustrating the step of removing the bone;

Fig. 7 is a view to smaller scale, generally similar to Fig. 3, illustrating a boned hock just subsequent to the bone removal and in which the bone cavity has been filled with an edible material;

Fig. 8 is a diagrammatic vertical section through a cooking apparatus in which the cooking of the hock is completed;

Fig. 9 is a diagrammatic elevation showing a transparent shipping container filled with hocks prepared in accordance with the present invention and immersed in pickle; and Fig. 10 is a diagrammatic perspective view, to very small scale, illustrating the way in which the prepared, cooked hock may be sliced for serving.

Referring to the drawings, the numeral 1 (Fig. 2) designates a raw pork hock as it is received from the butcher. This hock comprises irregular masses 2 of lean meat containing many streaks 3 of gristle and within which is embedded the bone structure 4. This bone structure is of irregular shape and extends throughout the length of the hock. The lean meat and bone are surrounded by layers 5 of fat and this in turn is encased in the skin or rind 6.

In accordance with the present invention, it is contemplated that a first step in the preparation of the hock may be that of smoking, the smoking being carried out in any of the ways customarily employed for imparting a smoked flavor to smoked shoulders or hams. This step of smoking a hock is optional and is not necessary except it be desired that the meat, when ready to eat, have a smoked flavor. If pre-smoked hocks are available, the first step in the present process is that of procuring such a hock.

Having obtained the raw hocks, either smoked or unsmoked, and having smoked the raw hock if it is desired to do so, the hocks are placed in a suitable container 7, here shown as an open topped vessel containing water, and are boiled just sufficiently to permit the bone 4 to be forced endwise out of the hock. Open kettle boiling of approximately one hour's duration is usually sufficient to permit such removal of the bone. Visual observation of the hock during cooking will indicate a sufficient degree of cooking when the meat has retracted from the end of the bone so that the bone projects approximately one-half inch from the meat, as indicated at 4a (Fig. 5). Care should be taken not to over-cook the hock during this preliminary cooking operation. When this preliminary cooking has been completed, the hock is removed from the cooking vessel and cooled sufficiently to handle, and then, by applying pressure to one end of the bone, the latter is forced completely out, this operation being indicated diagrammatically in Fig. 6. During the bone removal, the hock is so confined, for example by holding it tightly in the operator's hand, as substantially to maintain its original external shape and dimensions and prevent tearing it apart. The removal of the bone leaves a cavity 8 (Fig. 3) at the interior portion of the hock. In accordance with one modification of the present procedure this cavity may now be filled with a suitable edible material 9, as indicated in Fig. 7. This edible material may, for example, be stuffing or force meat such as is customarily used in meat cookery, for example in stuffing poultry, and comprising suitable spices and condiments designed to impart a pleasing flavor to the meat. Whether or not the cavity is filled with this stuffing 9, the hock is now placed in the cavity of a suitable mould M (Fig. 8). As illustrated, this mould has a cavity of more or less rectangular transverse section, but it is obvious that moulds having cavities of other transverse section, for instance round or egg-shaped, may be used if desired. The mould cavity may be of a size to hold a single hock or to hold a series of hocks placed end to end, as may be desired. The mould has a cover (not shown) which may be locked in place by means of latches 11, the cover being pressed down onto the hock or hocks within the cavity with sufficient pressure to conform the hocks to the shape of the mould cavity. The cover of the mould does not fit so tightly in the mould as to prevent escape of steam from the mould cavity.

Having pressed the cover upon the partly cooked hock in the cavity of the mould M, and having locked the cover in place, the entire mould M is then placed in a suitable container 10, water is put into the container, and the water is brought to the boiling point and the cooking is continued with the hock in the closed mould until the lean meat has been cooked to tenderness and the gristle has been reduced to a gelatinous state. The period for this second stage of boiling may be in the neighborhood of two hours, but may readily be determined by testing the meat from time to time by removal of the mould cover.

While open kettle cooking in both the first and second stages has herein been suggested, it is to be understood that pressure cooking may be resorted to with an appropriate reduction in the time for cooking of the order well known to those conversant with pressure cooking.

At the completion of the cooking in the mould cavity, the mould is removed from the vessel 10 and permitted to cool. The cover is then removed and the cooked hock is withdrawn from the mould cavity. When cooked in a mould having a cavity of generally rectangular transverse section, the cooked hock has approximately the appearance shown at 1a in Fig. 1 (it being impossible in the drawings to show the contrasting colors), the hock being of roughly rectangular transverse section with its lean meat compacted and surrounded by fat. If a mould of a different contour be employed, the transverse shape of the cooked hock will be of a correspondingly different shape. It will be found that by cooking in this manner the lean meat has a very bright pleasing deep pink appearance while the fat is clear and white, the rind being more or less transparent. While the hock may be served in this manner, being readily sliced into pieces of good size, as indicated at S (Fig. 10), it may be preferred to pickle the hock before it is served. As illustrated in Fig. 9, a container B, for example a large glass bottle or the like, has been packed with hocks 1a each having substantially the shape and appearance of that shown in Fig. 1, the container then being filled with an appropriate pickling liquid and being closed by the cover C. The hocks remain in the container until they have taken the flavor of the pickle and, when desired, may be removed one by one from the container. If desired, the hocks may be shipped in pickle in the container. When placed on display in the store, they have a pleasing and appetizing appearance by reason of their shape and color, in these respects contrasting very greatly with hocks as previously prepared for market which are more or less shapeless and often of a dark and unpleasing appearance.

While desirable methods of preparing the hock have herein been suggested by way of example, it is to be understood that the invention is broadly inclusive of any and all modifications falling within the scope of the appended claims.

I claim:

1. That method of preparing pork hocks for use which comprises as steps boiling the hock at atmospheric pressure for a period of approximately one hour, forcing out the bone by pressure applied to one end of the bone while confining the hock externally to prevent tearing, compressing the hock thereby reducing it to a predetermined size and shape, immersing the compressed hock in water and, while maintaining the size and shape so imparted to the hock, keeping it at a boiling temperature for approximately two hours until the gristly portion of the hock has been reduced to a gelatinous consistency and after cooling, releasing the hock from compression.

2. Method of preparing pork hocks which comprises as steps boiling the hock at atmospheric pressure for a period of approximately one hour thereby to permit the bone to be forced out by pressure applied to one end of the bone while externally confining the hock so as substantially to maintain its original external shape and dimensions, stuffing the cavity resultant from removal of the bone with an edible substance, compressing the hock and thereby reducing it to a predetermined size and shape, continuing to cook the hock while maintaining the size and shape so imparted to it until all parts are tender, and after cooling, releasing the hock from compression.

3. That method of preparing pork hocks for use which comprises as steps boiling the hock in water until the meat has shrunk sufficiently to expose approximately one-half inch of the bone, removing the bone by applying force to said exposed end while substantially preserving the external shape of the hock, subjecting the hock to pressure so applied as to reduce the hock to a predetermined size and shape, immersing the hock in water and while maintaining said size and shape, keeping the water at a boiling temperature until the lean meat, including the gristly portion, is tender, and, after cooling, removing the hock from the water and placing it in pickle.

4. That method of preparing pork hocks for use which comprises as steps first smoking the hock, then boiling the hock at atmospheric pressure for approximately one hour, forcing the bone out of the hock by the application of pressure to one end of the bone while confining the hock externally so as substantially to preserve its original external shape and dimensions, subjecting the hock to pressure so applied as to reduce the hock to a predetermined size and shape, immersing the hock in water and, while maintaining said size and shape, boiling the hock for approximately two hours and removing the hock from the boiling water.

CONSTANT RUGGIERO.

REFERENCES CITED

The following references are of record in the file of this patent:

UNITED STATES PATENTS

| Number | Name | Date |
|---|---|---|
| 223,106 | Black | Dec. 30, 1879 |
| 1,157,016 | Lotz | Oct. 19, 1915 |
| 2,037,892 | Gleason | Apr. 21, 1936 |
| 2,182,891 | Eikel | Dec. 12, 1939 |
| 2,299,946 | Alkire | Oct. 27, 1942 |